No. 12,742. REISSUED JAN. 28, 1908.

W. A. SUMNER.

INCUBATOR HEATER.

APPLICATION FILED MAY 21, 1907.

Witnesses

M. A. Beeler

M. A. Kelly

Inventor

Wm. A. Sumner

By

Beeler & Robb

Attorneys

THE NORRIS PETERS CO., WASHINGTON, D. C.

UNITED STATES PATENT OFFICE.

WILLIAM A. SUMNER, OF FAIRFIELD, NEBRASKA, ASSIGNOR OF ONE-THIRD TO HENRY E. SPENCER AND ONE-THIRD TO CHARLES J. HARRIS.

INCUBATOR-HEATER.

No. 12,742. Specification of Reissued Letters Patent. Reissued Jan. 28, 1908.

Original No. 826,385, dated July 17, 1906, Serial No. 252,424. Application for reissue filed May 21, 1907. Serial No. 374,946.

*To all whom it may concern:*

Be it known that I, WILLIAM A. SUMNER, a citizen of the United States, residing at Fairfield, in the county of Clay and State of Nebraska, have invented certain new and useful Improvements in Incubator-Heaters; and I do declare the following to be a full, clear, and exact description of the invention, such as will enable others skilled in the art to which it appertains to make and use the same.

My invention is an improved incubator-heater; and it consists in the construction, combination, and arrangement of devices hereinafter described and claimed.

It is an important object of the invention to adapt the device for convenient application to an incubator and to enable the ready removal and return of the lamp which generates the heat without disturbing the other elements of the apparatus.

A further object of the invention is to obtain a maximum radiating surface for heating the water without increasing the size of the heater, and to obtain an effective circulation of the water.

Another object of the invention is to effect an automatic control of the heater by the temperature of the chamber to be heated in order that said chamber may be maintained at a uniform temperature irrespective of the rise and fall of the temperature externally of the chamber.

Figure 1:
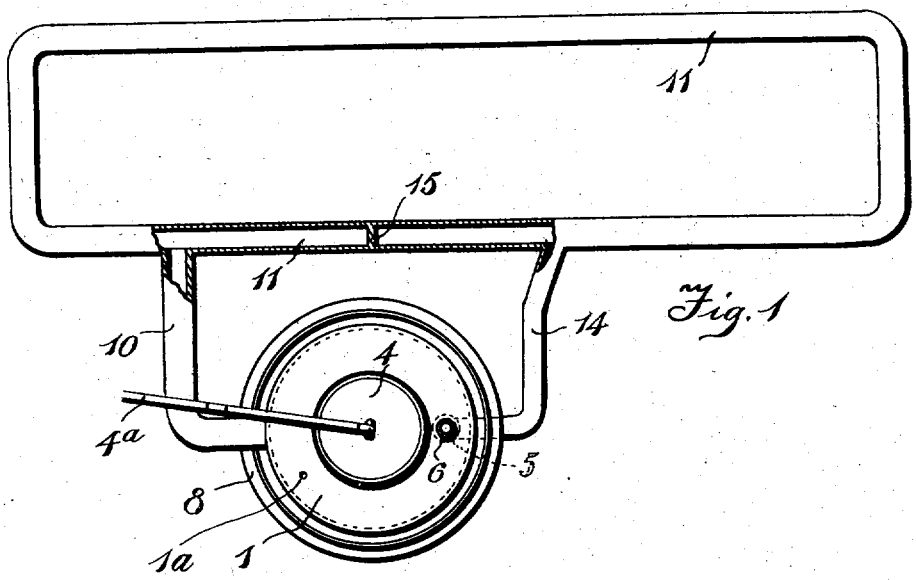
Figure 2:
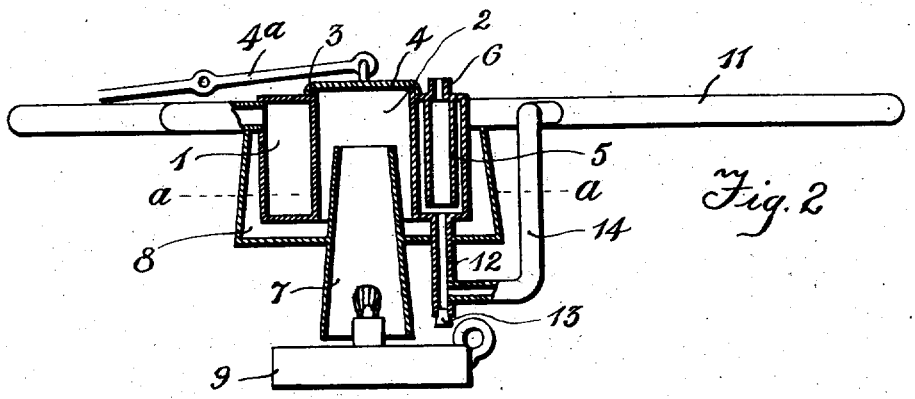
Figure 3:
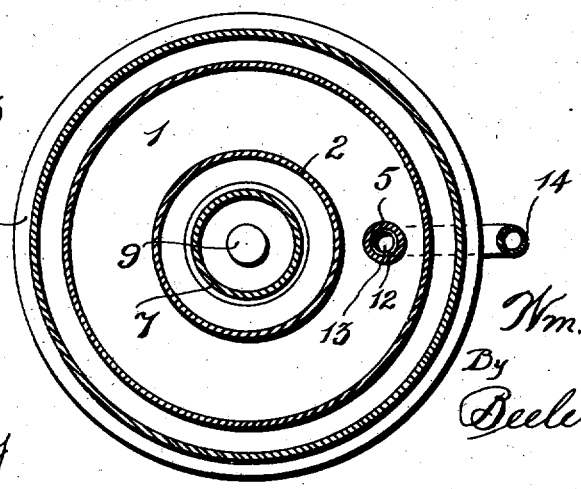

In the accompanying drawings, Figure 1 is a top plan view of an incubator-heater embodying my improvements; Fig. 2 is a vertical sectional view of the invention, and Fig. 3 is a horizontal sectional view taken on the plane indicated by the line *a—a* of Fig. 2, but on an enlarged scale.

The boiler 1 has a vertical central flue 2 extending therethrough, the upper end of which flue projects slightly above the top of the boiler and forms a seat 3 for the damper 4, operatively connected with the lever $4^a$, and which lever is adapted to be operated in any suitable or well known manner. In one side of the boiler is a vertically disposed tube or compartment 5 of suitable diameter and form, the lower end of which is open and terminates a short distance above the bottom of the boiler forming a seal, as hereinafter described. A water supply pipe 6 extends from the top of the boiler at a point communicating with the upper end of the tube 5, and in combination with said tube forms a seal and expansion element. A funnel or chimney 7 extends upwardly partly through the flue of the boiler. The latter is here shown as disposed in a casing or shell 8. A suitable lamp 9 may be employed to supply the heat required to heat the water in the boiler. The products of combustion will escape upwardly through the flue, and by means of the damper 4 the degree to which the water is heated may be readily regulated. The casing or shell 8, as before described, has the boiler 1 disposed therein, or in other words concentrically embraces the boiler. Said casing or shell has its open upper end terminating short of the top of the boiler and its lower end disposed below the lower end of the boiler and has its bottom pierced by the upwardly-tapered chimney 7, which rises within the boiler and projects a suitable distance below the bottom of the casing or shell. The chimney 7 is adapted to receive the burner of the lamp 9, and the latter is normally supported upon any suitable support.

When the lamp is burning the heated products of combustion will pass up through the chimney and the central hot-air flue of the boiler, while some of the products will pass upwardly through the annular space between the outside of the boiler 1 and the casing or shell 8, whereby the boiler has inner and outer heating surfaces, which materially promote the heating of the water. It will be here explained that when the water becomes heated circulation takes place from the boiler through the pipe 10 into the radiating tube 11 and then back through the pipe 14 into the pipe 12 and thence to the bottom of the boiler, whereby the relatively cool water is returned into the bottom of the boiler, so as to insure the proper circulation of the water.

It is proposed to regulate the paths of the products of combustion by the temperature within the chamber defined by the walls of the incubator, not shown, and this will be accomplished in the following manner. The damper 4 is provided for the top of the hot air flue 2 through the boiler, and this damper is carried by the end portion of a vertically swinging lever 4ª, fulcrumed on any suitable support, not shown. The lever 4ª is adapted to be actuated by any suitable means and hence the damper 4 will be raised and lowered accordingly.

A flow pipe 10 leads from the upper portion of the boiler at the side thereof opposite the pipe or seal 5 and discharges into a radiating tube 11, which is arranged in a horizontal plane about on a level with the top of the boiler 1, and which may be of any suitable form and of any suitable extent. The portions of the tube 11 connected with the pipes 10—14 are separated by the plug or partition 15.

Inasmuch as the boiler 1 is filled through the pipe 6 and communicating tube 5, it is necessary to provide a suitable vent 1ª at a suitable point in the top of the boiler which is open during the filling operation. A pipe 12 depends from the bottom of the boiler and communicates therewith at a point which registers with and is below the center of the lower end of the seal 5. The lower end of said pipe 12 is closed by a cork 13, whereby the contents of boiler 1 and the pipes may be discharged. A return pipe 14 leads from the radiating pipe 11 to the pipe 12.

The water in the seal 5 does not commingle with the water in the boiler excepting at the bottom of the seal, which is directly over the pipe 12, through which the partially cooled return water enters the boiler. Hence the partially cooled water in and at the lower end of the seal 5 keeps the latter at a temperature which will condense such steam as seeks to escape from the boiler. Hence loss of water from the boiler is minimized by the seal. The pipe 6 in addition to its function as a filling pipe also acts as an expansion pipe, as will be understood.

From the foregoing it will be noted that in the operation of the heater currents of air may pass out of or into the open top of the shell 8 depending upon the position of the damper 4. If the damper is closed hot air passes out, and if open cool atmospheric air passes in, impinging directly against the boiler, the top of the boiler extending as high or higher than the open top of the shell for this purpose. The structure disclosed is, therefore, exceedingly sensitive in use, it being of the utmost importance in devices of this character that the desired temperature be maintained substantially uniform.

When the lamp is first lighted the damper 4 will be closed. In this condition the draft of the lamp is indirect—that is to say, the heated products of combustion pass upwardly from the chimney 7 into the boiler flue 2, thence down into the casing or shell 8, and upwardly through the latter at the outside of the boiler, whereby the inner and outer surfaces of the boiler are subjected to the heat so as to quickly and uniformly heat the water. As the water becomes heated it circulates through the radiating tube 11 and back into the boiler, thereby heating the incubating compartment of the incubator by radiation. By means of the damper 4 and lever 4ª, which may be operated in any suitable manner well understood in the art to which my invention relates, the degree to which the water is heated may be readily regulated.

Having thus described my invention, what I claim as new, and desire to secure by Letters Patent, is—

1. A heater comprising a boiler, a flow-pipe leading therefrom, a radiating element into which the flow-pipe discharges, a return-pipe leading from the radiating element and discharging into the lower portion of the boiler, and a seal and expansion element to contain water, extending above the boiler, having a vent at its upper end and having its lower end open and extending downwardly in the boiler to a point immediately above and proximate to the discharge end of the return-pipe.

2. A heater comprising a boiler, a flowpipe leading therefrom, a radiating element into which the flow-pipe discharges, a return-pipe leading from the radiating element, discharging into the lower portion of the boiler and having means to discharge the water from the boiler, the radiating element and the flow and return-pipes, and a filling, sealing and expansion pipe open at its upper end, extending upwardly from the boiler and having its lower portion extending downwardly in the boiler and its lower end open and disposed immediately above and proximate to the discharge end of the return pipe.

3. A water-heater comprising a boiler, a flow-pipe leading therefrom, a radiating element into which the flow-pipe discharges, a return-pipe leading from the radiating element and discharging into the lower portion of the boiler, a sealing element located within the boiler to contain water and having a vent at its upper end adjacent to the top of the boiler, said sealing element extending downwardly in the boiler and being provided with an opening at its lower end proximate to the discharge end of the return-pipe, for the purpose described.

4. In a heater for incubators, the combination of a boiler having a central heating flue open at its upper end, damper regulating means for closing the upper end of said flue, a radiating tube connected with the boiler, a casing open at its upper end and having a bottom, said casing receiving the boiler therein, the sides and bottom of the casing being spaced from the sides and bottom of the boiler, respectively, the spaces therebetween being in communication, and the top of the boiler extending as high as the top of the casing to permit air at atmospheric temperature to impinge directly against the boiler and enter the space between the casing and boiler on adjustment of the damper regulating means to open the damper, and a chimney passing upwardly through the bottom of the casing and extending above the space between said bottom and the boiler and into the central flue of the latter.

This specification signed and witnessed this 16″ day of May, 1907.

WILLIAM A. SUMNER.

Witnesses:
D. B. MASSIE,
S. C. THOMPSON.